US012252188B2

(12) United States Patent
Semjonovs

(10) Patent No.: US 12,252,188 B2
(45) Date of Patent: Mar. 18, 2025

(54) VEHICLE STEERING SYSTEM AND A METHOD OF CONTROLLING A VEHICLE STEERING SYSTEM

(71) Applicant: ZF Automotive UK Limited, Solihull (GB)

(72) Inventor: Aleksejs Semjonovs, Birmingham (GB)

(73) Assignee: ZF Automotive UK Limited, West Midlands (GB)

( * ) Notice: Subject to any disclaimer, the term of this patent is extended or adjusted under 35 U.S.C. 154(b) by 291 days.

(21) Appl. No.: 18/073,093

(22) Filed: Dec. 1, 2022

(65) Prior Publication Data

US 2023/0192177 A1 Jun. 22, 2023

(30) Foreign Application Priority Data

Dec. 17, 2021 (GB) ..................... 2118412

(51) Int. Cl.
*B62D 5/00* (2006.01)
*B62D 6/00* (2006.01)
*B62D 15/02* (2006.01)

(52) U.S. Cl.
CPC ............ *B62D 5/006* (2013.01); *B62D 6/008* (2013.01); *B62D 15/0215* (2013.01)

(58) Field of Classification Search
CPC .... B62D 5/006; B62D 15/0215; B62D 5/005; B62D 6/008
See application file for complete search history.

(56) References Cited

U.S. PATENT DOCUMENTS

| 2015/0217801 A1 | 8/2015 | Takeda | |
|---|---|---|---|
| 2018/0065658 A1* | 3/2018 | Aoki | B62D 5/0463 |
| 2020/0247462 A1* | 8/2020 | Akutsu | H02P 29/028 |
| 2023/0227097 A1* | 7/2023 | Ojima | B62D 5/0484 |
| | | | 701/43 |

FOREIGN PATENT DOCUMENTS

JP 2010159040 A 7/2010

* cited by examiner

*Primary Examiner* — Jacob M Amick
(74) *Attorney, Agent, or Firm* — Kristin L. Murphy

(57) ABSTRACT

A steer-by-wire steering system for a vehicle comprises: a rotatable steering shaft; a driver-operated steering input member connected to the steering shaft; and first and second torque feedback motors having output shafts connected to the steering shaft and each being operable to apply either a feedback torque or an offset torque to the steering shaft. The system further comprises: an angular position measuring arrangement for measuring the angular position of the steering shaft; an angular acceleration determination arrangement for determining the angular acceleration of the steering shaft; an envelope determination arrangement for establishing or determining an envelope of the measured or calculated angular acceleration of the steering shaft; a magnitude determination arrangement for determining the magnitude of the offset torque to be applied by the motors as a function of the envelope of the angular acceleration of the steering shaft, as modified by a scaling factor whereby a maximum defined offset torque is applied at a maximum defined amplitude and angular acceleration of the steering shaft.

18 Claims, 6 Drawing Sheets

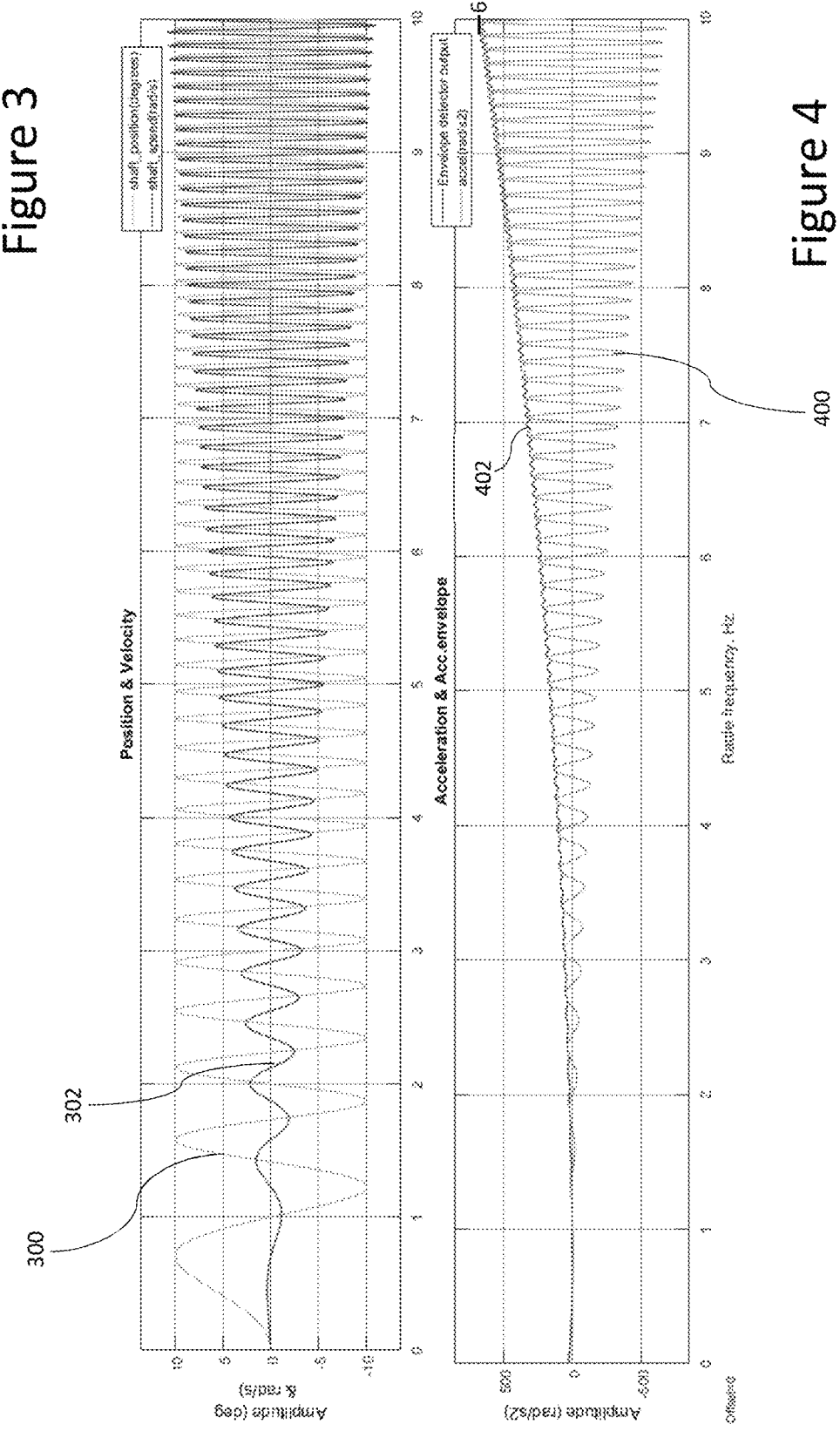

VEHICLE STEERING SYSTEM AND A METHOD OF CONTROLLING A VEHICLE STEERING SYSTEM

This application claims priority to UK Patent Application No. 2118412.2, filed Dec. 17, 2021, the disclosure of which is incorporated herein by reference in its entirety.

TECHNICAL FIELD

The present disclosure relates to a vehicle steering system and a method of controlling a vehicle steering system, and in particular to a steer-by-wire vehicle steering system and a method of controlling a steer-by-wire vehicle steering system.

BACKGROUND

In a steer-by-wire steering system, a steering wheel (or other driver-operated steering member such as a tiller) is attached to one end of an elongate steering column. The angular displacement of the steering column is measured to generate an electrical signal which is used to control the orientation of the steered wheels of the vehicle. In a steer-by-wire steering system, there is no physical connection between the steering wheel and the steered wheels, and so normally the steering column is also connected via gearing to an electric motor (known as a torque feedback unit) which applies a torque to the steering column in an opposite direction to the torque applied by the driver, in order to provide a sensation of "road feel" to the driver.

If a single electric motor is used in the torque feedback unit, it is held in locked contact with the gearing by a spring. However, in certain driving conditions the action of the spring is not sufficiently firm, which allows the gears to "rattle" during sinusoidal motions or sharp position changes of the steering column, i.e. the gears connecting the motor to the steering column impact on each other due to insufficient connection between them. In addition, the spring is a passive component and relies on its inherent properties to implement the motor-to-gearbox connection.

SUMMARY

In an attempt to overcome the problems associated with use of a single motor, use of two motors which can be actively controlled both to provide torque feedback to the steering column and to ensure that both motors are continuously in contact with their associated gearing, is proposed in order to minimise rattle. The use of two motors also allows active management of the friction.

The principle of a twin-motor torque feedback unit is illustrated in FIGS. 1 to 2, in which two identical torque feedback motors 10, 12 have a respective output shaft 14, 16, each of which carries a helical worm portion (illustrated schematically at 18, 20) which engage diametrically opposed portions of a worm gear (illustrated schematically at 22) rigidly connected to a steering shaft 24 which is in turn rigidly connected to a steering wheel 26. Application of torque by a driver in a clockwise direction indicated by solid arrow 28 results in rotation of the steering wheel 26 and the steering shaft 24 and is detected by a rotation sensor (not shown). The first motor 10 is then actuated to apply a torque in the opposite direction as indicated by dashed arrow 30. The second motor 12 is also actuated to apply either a torque 32 in the opposite direction in the form of an "offset torque" to reduce gear rattling or a torque 34 in the same direction to increase the feedback torque to the steering shaft 24, but the direction of torque depends on the circumstances, as will be explained below with reference to FIG. 2. However, the net result of the torques applied by the first and second motors 10, 12 results in an application of a feedback torque to the steering shaft 24 and steering wheel 26 in the opposite direction to that applied to the steering wheel by the driver, as indicated by a dashed arrow 36, to provide a sensation of road feel to the driver.

In this way, the "rattle" produced between the motor gearing 18, 20 and the worm gear 22 can be eliminated or significantly reduced.

FIG. 2 is a graph of the amount of feedback torque demanded (x-axis) against the feedback torque applied (y-axis). Dashed lines T1 and T2 represent the torque applied by motors 10 and 12 respectively and $T_{NET}$ represents the net torque applied by the two motors.

In torque ranges A1 and A2, one of the motors 10, 12 is applying a torque T1, T2 to provide feedback to the steering shaft 24 and steering wheel 26, while the other motor applies a smaller torque (an "offset torque") in the opposite direction to provide an "active" lock to eliminate or reduce transmission rattle. The roles of the motors change in ranges A1 and A2, depending in which direction the driver is steering. In other words, in torque range A1 motor 10 applies a feedback torque to the steering shaft 24 and the motor 12 applies a smaller "offset" torque in the opposite direction and in torque range a to motor 12 applies a feedback torque to the steering shaft 24 and the motor 10 applies a smaller "offset" torque in the opposite direction.

However, there is a torque range limit, indicated at L1 and L2 respectively where offset can be used, as there is a maximum feedback torque which can be applied by each motor, and if more feedback torque is required than can be supplied by one motor, the motor which previously provided an "offset" torque in the opposite direction is now required to apply torque in the same direction as the other motor to produce an increased feedback torque on the steering wheel.

In FIG. 2, it can be seen that in range A1, the feedback torque T1 from motor 10 increases with increasing driver demand and a constant "offset" torque $T2_{CONST}$ is applied by motor 12 in the opposite direction. At limit L1, the feedback torque demanded exceeds that which can be provided by motor 10 alone and with increased driver demand the motor 12 is operated to apply a torque in the same direction as motor 10 to increase the feedback torque. The maximum amount of feedback torque corresponds to that provided by both motors 10, 12 acting in the same direction, as shown at $T_{MAX}$. The situation is reversed (i.e. application of a constant offset torque $T1_{CONST}$ up to a limit L2) when the feedback torque generated in response to driver demand is applied in the opposite direction, as indicated by the graphs.

The magnitude of the "offset" torque can be regulated by setting an offset variable to a higher or lower value. A higher offset torque value provides increased resistance to "rattle" but creates additional friction in the system. Conversely, a lower offset a torque value increases the likelihood of "rattle" but reduces the friction in the system.

In accordance with a first aspect of the present disclosure, a steer-by-wire steering system comprises:
 a rotatable steering shaft;
 a driver-operated steering input member connected to the steering shaft;
 first and second torque feedback motors having output shafts connected to the steering shaft and each being operable to apply either a feedback torque or an offset torque to the steering shaft;

the system further comprising:
an angular position arrangement for measuring the angular position of the steering shaft;
an angular acceleration arrangement for determining the angular acceleration of the steering shaft;
an envelope determination arrangement for establishing or determining an envelope of the measured or calculated angular acceleration of the steering shaft;
a torque magnitude determination arrangement for determining the magnitude of the offset torque to be applied by the motors as a function of the envelope of the angular acceleration of the steering shaft, as modified by a scaling factor whereby a maximum defined offset torque is applied at a maximum defined amplitude and angular acceleration of the steering shaft.

The angular acceleration of the steering shaft is a good predictor of the "rattle", and so by determining the magnitude of the offset force as a function of the envelope of the angular acceleration, an offset force is only applied when it is necessary to do so in order to suppress transmission rattle.

The steering system preferably further comprises means for setting a minimum offset torque to be applied by the motors.

In one exemplary arrangement, the steering system further comprises a setting arrangement for setting a desired maximum rattle frequency of the steering shaft.

In one exemplary arrangement, the steering system further comprises a setting arrangement for setting a desired maximum rattle angle of the steering shaft.

In one exemplary arrangement, the steering system may further comprise a selecting arrangement for selecting a dynamic mode or a static mode.

The driver-operated steering input member may comprise a steering wheel.

In accordance with a second aspect of the present disclosure, there is provided a method of controlling a steer-by-wire steering system of the type comprising:
a rotatable steering shaft;
a driver-operated steering input member connected to the steering shaft;
first and second torque feedback motors having output shafts connected to the steering shaft and each being operable to apply either a feedback torque or an offset torque to the steering shaft:
the method comprising:
measuring an angular position of the steering shaft;
determining an angular acceleration of the steering shaft;
establishing or determining an envelope of the measured or calculated angular acceleration of the steering shaft; and
determining a magnitude of the offset torque to be applied by the motors as a function of the envelope of the angular acceleration of the steering shaft, as modified by a scaling factor whereby a maximum defined offset torque is applied at a maximum defined amplitude and angular acceleration of the steering shaft.

In one exemplary arrangement, the method may further comprise setting a minimum offset torque to be applied by the motors.

In one exemplary arrangement, the method may further comprise setting a desired maximum rattle frequency of the steering shaft.

In one exemplary arrangement, the method may further comprise setting a desired maximum rattle angle of the steering shaft.

In one exemplary arrangement, the method may further comprise selecting a dynamic mode or a static mode.

The present disclosure also includes a vehicle comprising a steer-by-wire steering system in accordance with the first aspect of the disclosure or controlled in accordance with a method in accordance with the second aspect of the disclosure.

BRIEF DESCRIPTION OF THE DRAWINGS

By way of example only, a specific exemplary arrangement of the present disclosure will now be described with reference to the accompanying drawings, in which:

FIG. 3 shows the relationship 300 between the rattle frequency in Hz (x-axis) against amplitude (in degrees) of the position of a steering shaft and the relationship 302 between the rattle frequency in Hz (x-axis) against a derived shaft velocity (in rad s$^{-1}$) of the shaft in a twin-motor steer-by-wire system in accordance with the present disclosure;

FIG. 4 is a graph showing the relationship between rattle frequency and the acceleration, and the associated acceleration envelope, of a steering column in a steer-by-wire system;

DETAILED DESCRIPTION

Figure 1:
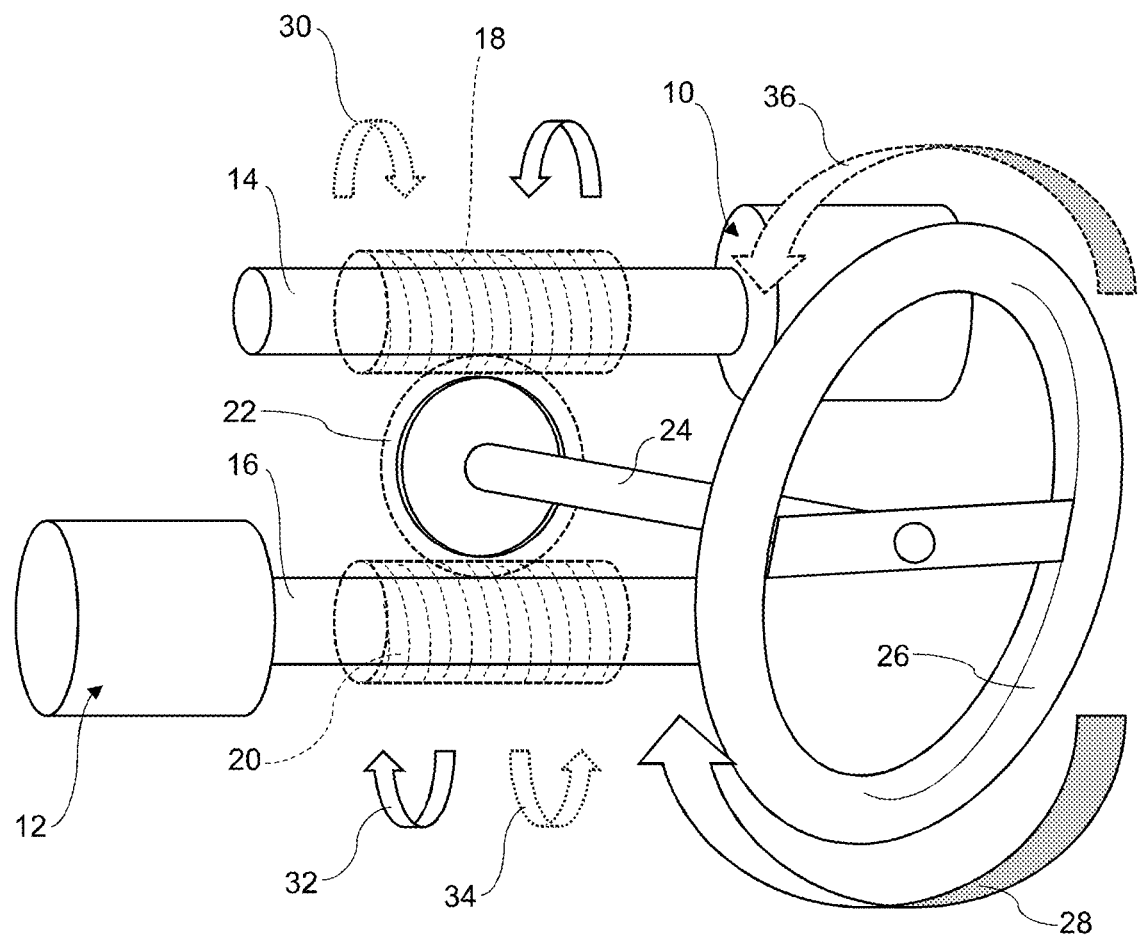
FIG. 1 is a schematic illustration of a steer-by-wire steering system having two motors which cooperate to provide a feedback torque.
Figure 2:
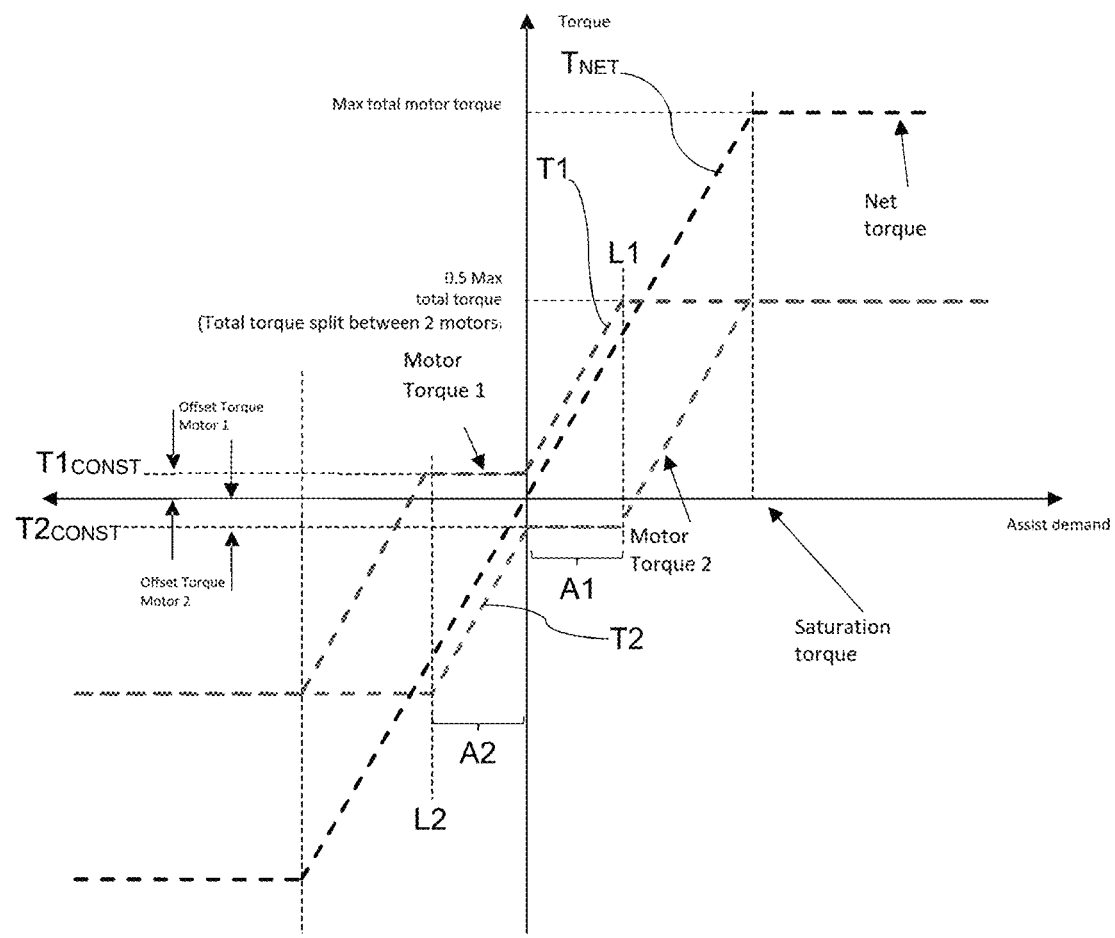
FIG. 2 is a graph showing the relationship between the amount of feedback torque required against the amount of feedback torque generated for a known steer-by-wire system.

The general principle behind the present disclosure is that an offset torque (i.e. a torque applied by a motor in an opposite direction to that applied by another motor generating a feedback torque) is only applied when necessary, and in circumstances where "rattle" is likely to occur. In general, it has been found that higher frequency sinusoidal movements of a steering wheel (and of a steering column to which the steering wheel is attached) will create a stronger rattle. In the present disclosure, a higher offset is applied when higher frequency movements are detected, in order to avoid rattle, and a lower offset supplied when lower frequencies are detected, in order to reduce friction.

In the present disclosure, an acceleration of the steering shaft is measured or calculated and an envelope of the acceleration as it varies with rattle frequency is detected and scaled to arrive at a value for the offset torque to be applied. The output is scaled to a desired range by using two parameters, namely a maximum rattle frequency ("max_rattle_freq") and a maximum rattle angle ("max_rattle_angle").

The acceleration of the steering shaft is used as an input because an offset torque is only required when "rattle" is detected, and it is known that rattle occurs during sinusoidal or sharp movements of the steering wheel, and the offset will ramp up in accordance with the detected envelope as the rattle frequency increases, as will be explained. It is not desirable to use the speed of rotation of the steering wheel as an input, because rotation at a constant speed does not predict rattle. During rotation of the steering wheel at a constant speed, the acceleration will remain at zero (or at a low value as a result of noise) but will be sinusoidal during a "rattle" condition due to the nature of the sinusoidal derivative.

If speed were to be used as an input and the steering shaft were rotated at a constant speed, as the speed is non-zero then the envelope detector would output a non-zero torque offset. However, rotation at constant speed does not create rattle, and so speed is a poor predictor of rattle. In contrast, acceleration remains at zero during constant speed and will react to sharp or abrupt changes, resulting in an increased torque offset, which is desirable.

The following equations define the position, velocity and acceleration respectively of the steering shaft (N.B. angles in degrees are converted to radians).

The equations assume mostly sinusoidal behaviour during rattle conditions, even if the driver of the vehicle makes only one or a few short, sharp turns.

$$\text{position} = \sin(2\pi ft) * \frac{2\pi}{360}$$

$$\text{velocity} = \frac{d\,\text{position}}{dt} = \frac{d\sin(2\pi ft)}{dt} = \cos(2\pi ft) * 2\pi f * \frac{2\pi}{360}$$

$$\text{acceleration} = \frac{d\,\text{velocity}}{dt} = \frac{d\cos(2\pi ft) * 2\pi f}{dt} = -\sin(2\pi ft) * 4\pi^2 f^2 * \frac{2\pi}{360}$$

The acceleration to position magnitude ratio is therefore as follows:

$$\left|\frac{\text{acceleration}}{\text{position}}\right| = \left|\frac{-\sin(2\pi ft) * 4\pi^2 f^2 * \frac{2\pi}{360}}{\sin(2\pi ft)}\right| = 4\pi^2 f^2 \frac{2\pi}{360}$$

$$\left|\frac{\text{acceleration}}{\text{position}}\right| \sim f^2$$

Therefore, it can be seen that the relationship between acceleration and position of the steering shaft is quadratic. Consequently, any offset calculated on the basis of acceleration will increase in a quadratic manner depending on the "rattle" frequency.

It should also be noted that the above equations do not just define position, velocity and acceleration, but on the assumption of sinusoidal movement of the steering shaft during a rattle condition, it is possible to derive a relationship between position, velocity and acceleration, which allows for scaling after passing through an envelope detector (using parameters such as max_rattle_angle for scaling, which defines the maximum position amplitude during rattle).

FIG. 3 shows the relationship 300 between a rattle frequency in Hz (x-axis) against an amplitude (in degrees) of the position of a steering shaft in a steer-by-wire system and the relationship 302 between the rattle frequency in Hz (x-axis) against the derived shaft velocity (in rad s$^{-1}$) of the shaft.

FIG. 4 shows the relationship 400 between the rattle frequency in Hz (x-axis) against a derived shaft acceleration (in rad s$^{-2}$) and the detected envelope 402 of the sinusoidal acceleration signal during rattle. It will be seen from FIG. 4 that the envelope detector is tuned to detect the envelope of the sinusoidal acceleration signal during rattle.

In addition, however, it is necessary to apply scaling to the detected acceleration envelope so that at the maximum rattle angle amplitude ("max_rattle_angle") and the maximum rattle frequency ("max_rattle_freq"), the maximum dynamic offset is achieved. By varying the maximum rattle frequency and the maximum rattle angle, the desired envelope shape can be altered, based on the desired response.

It is also possible, but not essential, to apply an initial constant offset torque. If an initial constant offset torque is applied, the same envelope shape is retained at values greater than the constant offset value, as will be explained. In other words, any applied constant offset value becomes the minimum value for a dynamic offset output.

Figure 5:
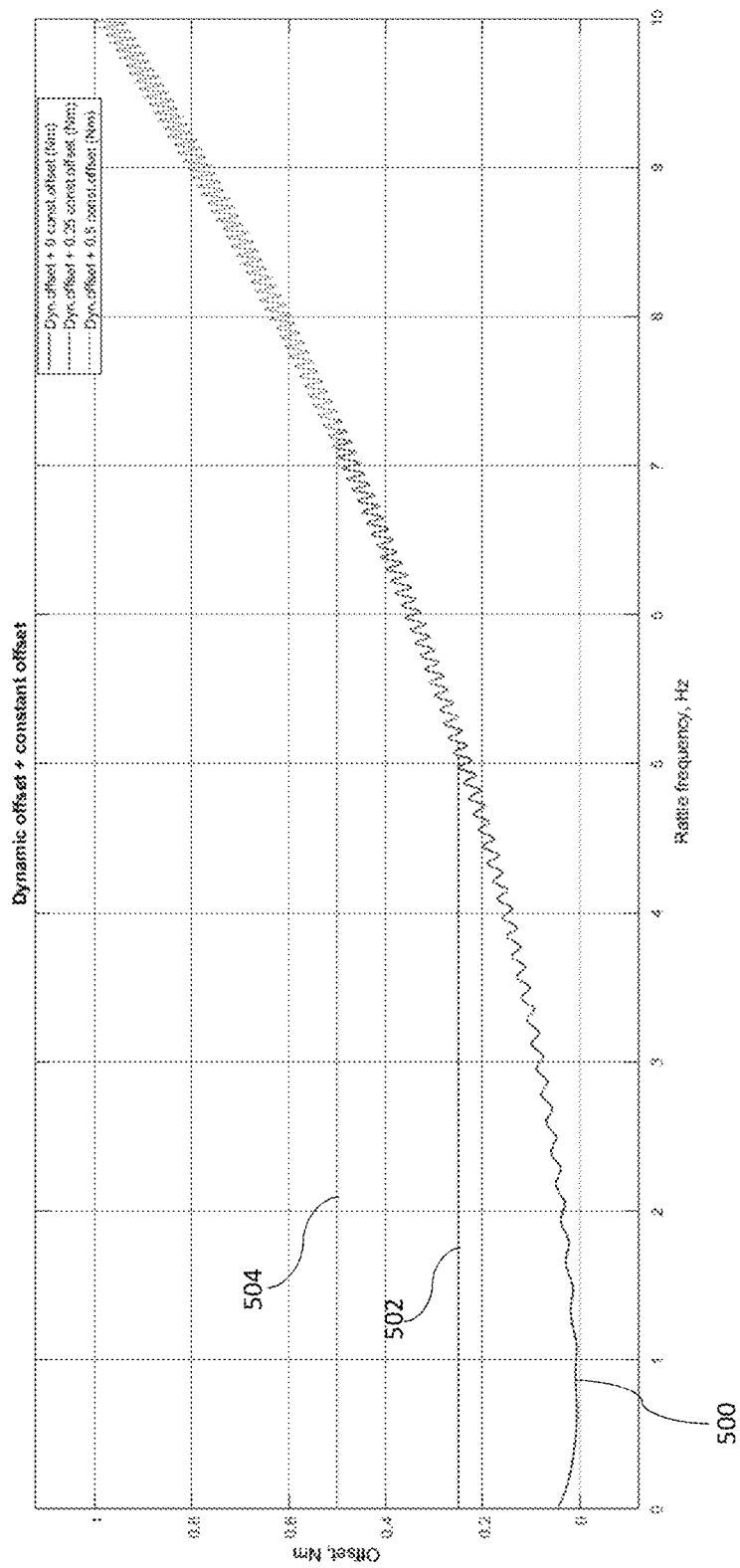
FIG. 5 is a graph showing the dynamic offset output (the scaled envelope output) showing different minimum constant offsets.

This is illustrated in FIG. 5, which shows first, second and third scaled dynamic offsets 500, 502, 504 having a zero constant offset, a constant offset of 0.25 Nm and a constant offset of 0.5 Nm respectively. It will be observed that for the zero constant offset 500, the scaled dynamic offset corresponds to the detected acceleration envelope, as modified by the scaling. For the 0.25 Nm and 0.5 Nm constant offsets 502, 504, the constant offset torque is applied as a minimum value until the value determined by the envelope is reached (just above 5 Hz and just above 7 Hz respectively), after which the dynamic offset corresponds to the detected acceleration envelope, as modified by the scaling.

In other words, if the offset is scaled to achieve 1 Nm (at max_dynamic_offset set to 1 Nm) at 10 Hz with 10° rattle amplitude, it will scale automatically to whatever max_dynamic_offset is applied. When a constant offset is applied (see curves 502, 504) that constant offset becomes the minimum offset. If the dynamic offset exceeds the constant offset than the offset follows the dynamic pattern.

By way of example, if the maximum rattle angle amplitude ("max_rattle_angle") is 10° and the maximum rattle frequency ("max_rattle_freq") is 10 Hz, and if a maximum dynamic offset torque ("max.dyn.offset") of 1 Nm is desired, then the following is true:

$$dyn.\,\text{offset} = \text{envelope. det. output} * \text{scaling}$$

$$\text{scaling} = \frac{\text{max. } dyn.\,\text{offset}}{\text{max. envelope. det. output}} = \frac{1}{689.03} \approx 0.00145$$

(Note the maximum value of 689.03 in Figure 4, calculated as follow:)

$$\text{max. envelope. det. output} = 4\pi^2 f^2 \frac{2\pi}{360} * \text{max\_rattle\_angle (in degrees)}$$

$$= 4\pi^2 * (\text{max\_rattle\_frequency})^2 * \frac{2\pi}{360} * \text{max\_rattle\_angle}$$

$$= 4 * \pi^2 * 10^2 * \frac{2\pi}{360} * 10 = 689.03 \text{ rad/s}^2$$

In the above, max.envelope.det.output is the value of the maximum amplitude of the acceleration signal at a given frequency.

Figure 6:
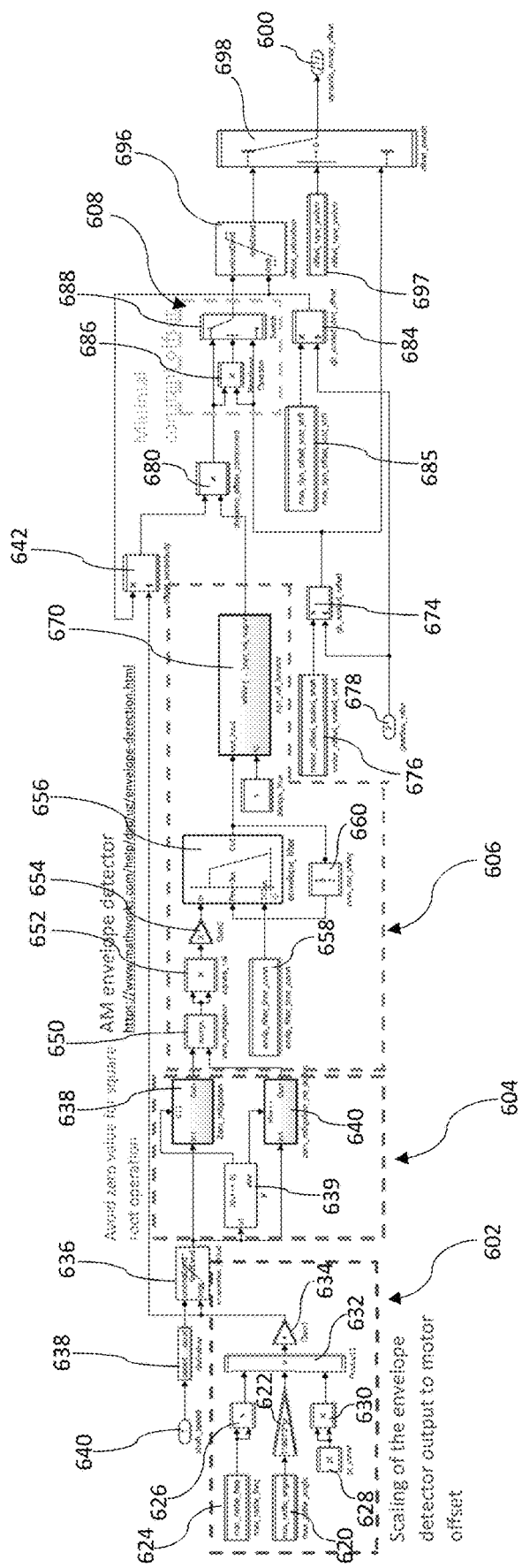
FIG. 6 is an illustration of an example of a control system for implementing the control of a steer-by-wire system in accordance with the present disclosure.

One example of how the acceleration envelope is detected and scaling applied is shown schematically in the algorithm of FIG. 6. Many different methods of envelope detection can be used, and the algorithm shown in FIG. 6 is based on a simplified version of that found at https://www.mathworks.com/help/dsp/ug/envelope-detection.htm.

The algorithm of FIG. 6 produces a dynamic motor offset ("dynamic_motor_offset") 600 and comprises four main functions as follows:

602: scaling of the envelope detector output to the motor offset

604: avoidance of zero value for square root operation

606: a simplified amplitude modulation (AM) envelope detector

608: a minimum constant offset

Each of the above units will be discussed in more detail below, together with an explanation of their interoperability.

602: scaling of the envelope detector output to the motor offset

The value for the defined maximum rattle angle amplitude ("max_rattle_angle") is input at 620 and the value is converted to radians at 622. The value for the maximum defined rattle frequency ("max_rattle_freq") is input at 624 and is squared at 626. A pi constant is input at 628 which is squared at 630. The outputs of 622, 626 and 630 are multiplied at 632 and amplified at 634, the amplified output being supplied to an acceleration limiting module 636 which also receives a steering shaft acceleration signal from 638 generated in response to input of a shaft speed signal at 640. The acceleration limiting module limits the acceleration to the maximum scaling amplitude. The output from 634 is also fed to an offset sensitivity stage 642.

604: avoidance of zero value for square root operation

This function comprises three "if/else" statement blocks 638, 639, 640, and the output "acceleration_limited" from the acceleration limiting module 636 is fed to the input of each of the three blocks 638, 639, 640. At block 639, if the input u1=0, an output signal is sent to a further input of block 638, and if the input u1≠0, an output signal is sent to a further input of block 640. (In fact, if used for code generation, if u1=0, the actual value of "acceleration_limited" would be increased by a very small amount, e.g. 0.001, because a zero value might introduce errors in the square root operation, as it uses division operation.)

Blocks 638, 640 in combination have a zero mitigation function and effectively form a "if/else" function. The overall effect of function 604 is that if the output from the acceleration limiting module 636, some small number (e.g. 0.001) is added on top of the input, and in all other cases the signal is allowed to pass unchanged. The output of each of operators 638, 640 is supplied to, and merged by, a zero mitigation step "zero_mitigation" 650 of the AM envelope detector 606.

606: a simplified amplitude modulation (AM) envelope detector

The AM envelope detector is a simplified detector in order to reduce CPU load and produces a signal output quality which is sufficient for the particular application. Generally, the envelope detector connects all of the peaks in the acceleration signal and produces an envelope which, as indicated in FIG. 4, increases with rattle frequency. The amplitude modulation (AM) envelope detector function is effectively in the form of an infinite impulse response low-pass filter, based on discrete time implementation and is well known to those skilled in the art.

The output of the zero mitigation step 650 is squared at 652 and amplified at 654 and forms one input of a low pass envelope filter 656 which removes high-frequency components from the sinusoidal/high-frequency signal received from amplifier 654, to leave only the envelope of the signal. The other inputs to the processing step are an envelope filter time constant ("envelp_filter_time_const") 658 whose value is calculated to achieve a desired cut-off frequency and a delayed output from the low pass envelope filter 656 via delay circuit 660 which inputs a previous output of the filter, which is required for the calculation to achieve correct filter performance.

The output of the low pass envelope filter 656 supplied to a square root input of a square root value iterator component 670 and the output of 670 is fed to one input of a dynamic offset component 680, which is a multiplier, the other input of which is received from the output of the offset sensitivity stage 642. Block 642 outputs a scaling value obtained from a first input "max_dyn_offset" from a "gb_scaled_dyn_offset" operator 684 (described further below) and the "max_envelope_det_output" from 602, and the scaling value is equal to the max_dyn_offset/max_envelope_det_output. The dynamic offset value calculated at component 680 is equal to "envelope_detector_output" from component 670 multiplied by the scaling value from component 642.

608: a minimum constant offset

The output of the dynamic offset component 680 is fed to a relational operator 686 of the minimum constant offset unit 608, and the relational operator 686 also receives an input from the output of the "gb_scaled_offset" operator 674, which receives inputs from a "motor_offset_scaled_shaft" operator 676 and a "gearbox_ratio" detector 678. The "motor_offset_scaled_shaft" operator 676 is a motor offset scaled to user side values (e.g. offset at the motor gearbox ratio). A user inputs the desired degree of "feel" at the steering wheel, which is scaled down to the motor level for the control circuit. The "motor_offset_scaled_shaft" operator 676 is used either to set a minimum offset in a dynamic mode or to set an offset value in a static mode.

The offset component 680 also comprises a switch 688 which receives inputs from the output of the dynamic offset component 680, the output of a relational operator 686 and the output of the "gb_scaled_offset" operator 674. The "gb_scaled_offset" operator 674 in turn receives inputs from the "gearbox_ratio" detector 678 and from a "max_dyn_offset_scid_shaft" operator 685 which is used to set the maximum offset allowed in the software control. The switch 688 thereby operates to produce an output which will output either minimum offset or dynamic offset, whichever is larger. In other words, switch 688 ensures that a minimum offset value is set when the dynamic offset setting falls below a threshold. For example, if the minimal offset is 0.5 Nm but the dynamic offset produced is 0.3 Nm than the actual offset applied in a dynamic mode will be 0.5 Nm (minimum offset) because the minimum offset>the dynamic offset. However, in the event of severe rattling such that the dynamic offset were to be, for example, 0.7 Nm then 688 will output 0.7 Nm because the minimum offset<the dynamic offset.

The output of switch 688 is fed to an "offset_saturation" operator 696, which also receives an input from the output of a "gb_scaled_dyn_offset" operator 684. The offset saturation block 696 limits the constant offset from block 608 which is allowed to be applied in dynamic mode as a precaution, so that the value cannot exceed that set by the user at 685. The operator 684 receives inputs from operator 685 and a gearbox ratio indicator function 678 and produces an output "gb_scaled_dyn_offset" equal to "shaft_Scaled_dyn_offset" from operator 685 divided by a "gearbox_ratio" value from 678 and thereby scales down the value selected at 685 to motor level values. As mentioned above, the output of 684 is also fed to an input of the offset sensitivity stage 642.

The output of the "offset_saturation" operator 696 is also fed to one input of an "offset_switch" 698, which also receives inputs from an "offset_type_switch" operator 697 (which allows manual switching between dynamic offset and static (manual) offset) and from the gearbox scaled offset operator 674 whose output equals "motor_offset_scaled_shaft" from block 676 divided by "gearbox_ratio" from operator 678 and is therefore scaled to motor level by the gearbox ratio. The "offset_switch" 698 thereby receives the values of both the dynamic mode and the static mode and switches the output (i.e. allows one value through) depending on the value of the "offset_type_switch" operator 697. In essence, if "offset_type_switch"=1, the output of 696 will be allowed through, and if "offset_type_switch"=0, the output of 674 will be allowed through. A "dynamic_motor_offset" operator 600 receives a signal from the offset switch 698 which is a scaled value of the envelope, adjusted to provide a minimum constant offset, if selected. The offset switch 698 selects which type of offset to use as the output based on the value of the "offset_type_switch" signal from switch 697, namely dynamic offset (value 1) or static offset (value 0), both of which are provided to the offset switch 698 at the same time.

Figure 7:
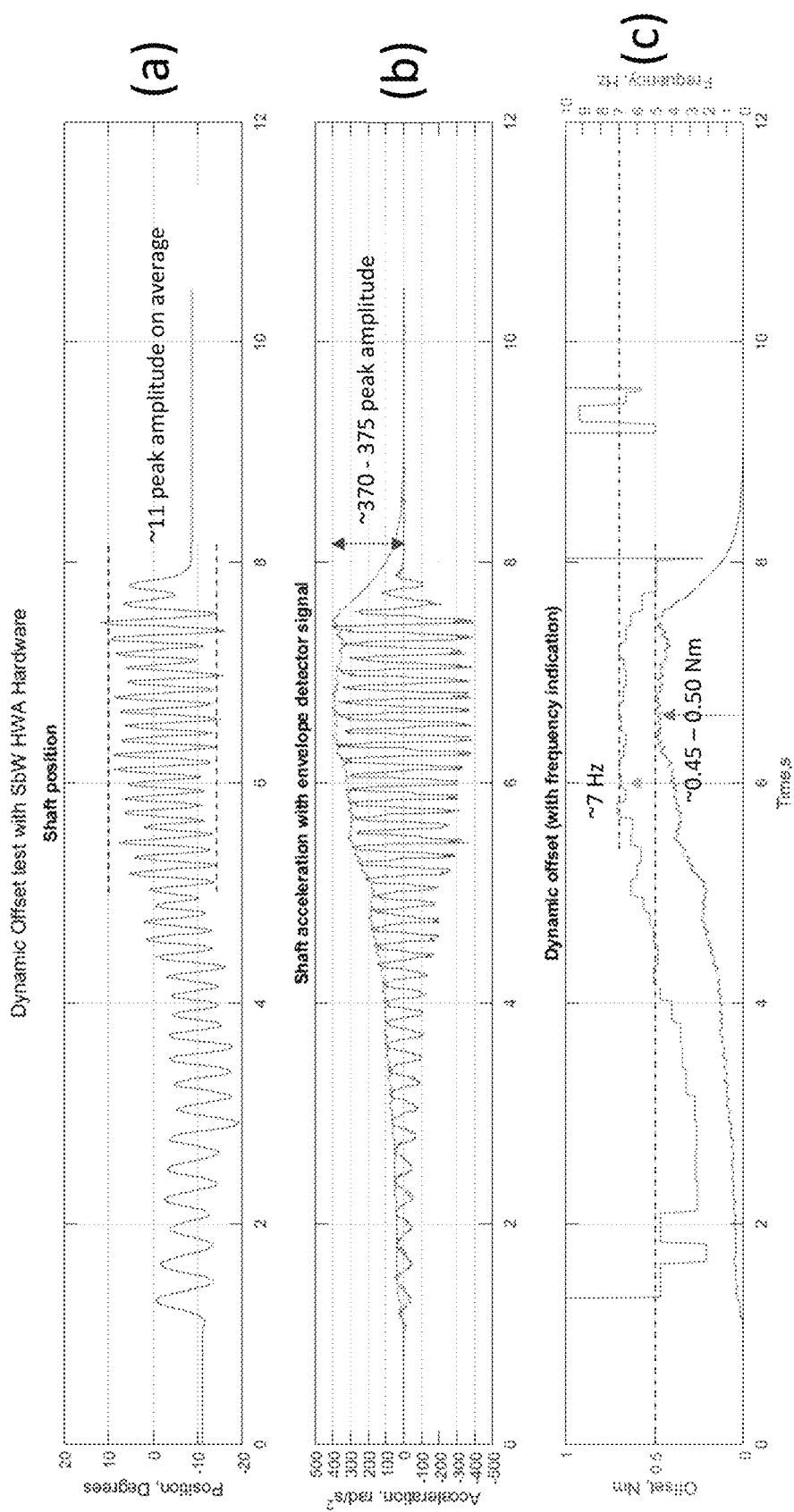
FIGS. 7(a) to 7(c) are graphs showing the relationship between time (x-axis) and a position, acceleration and generated offset respectively in practical testing of the apparatus in accordance with the present disclosure.

FIGS. 7(*a*) to 7(*c*) depict graphs that show the relationship between time (x-axis) and the position, acceleration and generated offset respectively in practical testing of the arrangement of FIG. 6.

In the tests to which FIG. 7 refers, the settings were as follows:
maximum amplitude: 10°
maximum rattle frequency: 10 Hz
maximum dynamic offset: 1 Nm (the motor is scaled with 85% gearbox efficiency)
constant offset: 0 Nm The testing was carried out manually under laboratory conditions and consequently maintaining the amplitude at the same level as the maximum setting was difficult. However, it will be observed that the peak position amplitude is between 8° to 12°. The internal frequency counter also indicates that the rattle frequency peaked at 7 Hz, noting that anything outside of the sinusoidal shape of the acceleration signal can be ignored, because of how the frequency is calculated. The frequency counter was implemented specifically for calculating frequency of a sinusoid will signal. In the event of non-sinusoidal (or even non-periodic) signals, then the output of the counter is unusable and can be ignored for the purposes of the tests.

So filtering was required for the acceleration, otherwise the signal became too noisy. Filtering of the acceleration signal is generally required for the algorithm to work, because acceleration is acquired by means of differentiating velocity signals, which commonly are already noisy, and consequently the derived acceleration signal is even noisier.

FIG. 7 indicates that at 7 Hz, the shaft position peak amplitude was of the order of 11°, which corresponds to an acceleration amplitude of the order of 370 to 375 rad s$^{-2}$, corresponding to a dynamic offset of the order of 0.45 to 0.50 Nm. If this is inserted into the amplitude equations, the following is obtained:

envelope. det. output =

$$4\pi^2 * (\text{frequency})^2 * \frac{2\pi}{360} * \text{angle} = 4\pi^2 * (7)^2 * \frac{2\pi}{360} * 11 \approx 371 \frac{\text{rad}}{\text{s}^2}$$

Scaling is the same due to settings, but 85% efficiency is applied to the gearbox:

scaling≈0.00145*0.85≈0.00128 dyn-offset=envelope-det-output*scaling=371*0.00128≈0.475 Nm

Overall, therefore, operation of the algorithm on real hardware behaves as expected.

The disclosure is not restricted to the details of the foregoing exemplary arrangement.

The invention claimed is:

1. A steer-by-wire steering system comprising:
   a rotatable steering shaft;
   a driver-operated steering input member connected to the steering shaft;
   first and second torque feedback motors having output shafts connected to the steering shaft and each of the first and second torque feedback motors being operable to apply either a feedback torque or an offset torque to the steering shaft;
   the system further comprising:
   an angular position arrangement for measuring the angular position of the steering shaft;
   an angular acceleration arrangement for determining the angular acceleration of the steering shaft;
   an envelope detection arrangement for establishing or determining an envelope of the measured or calculated angular acceleration of the steering shaft; and
   a magnitude of offset determination arrangement for determining the magnitude of the offset torque to be applied by the motors as a function of the envelope of the angular acceleration of the steering shaft, as modified by a scaling factor whereby a maximum defined offset torque is applied at a maximum defined amplitude and angular acceleration of the steering shaft.

2. A steer-by-wire steering system as claimed in claim 1, further comprising minimum offset torque arrangement for setting a minimum offset torque to be applied by the motors.

3. A steer-by-wire steering system as claimed in claim 1, comprising a maximum rattle frequency arrangement for setting a desired maximum rattle frequency of the steering shaft.

4. A steer-by-wire steering system as claimed in claim 1, further comprising a maximum rattle angle arrangement for setting a desired maximum rattle angle of the steering shaft.

5. A steer-by-wire steering system as claimed in claim 1, further comprising a selector arrangement for selecting a dynamic mode or a static mode.

6. A steer-by-wire steering system as claimed in claim 1, wherein the driver-operated steering input member comprises a steering wheel.

7. A method of controlling a steer-by-wire steering system of that comprises:
   a rotatable steering shaft;
   a driver-operated steering input member connected to the steering shaft;
   first and second torque feedback motors having output shafts connected to the steering shaft and the first and second torque feedback motors being operable to apply either a feedback torque or an offset torque to the steering shaft;
   the method comprising:
   measuring an angular position of the steering shaft;
   determining an angular acceleration of the steering shaft;
   establishing or determining an envelope of the measured or calculated angular acceleration of the steering shaft; and
   determining a magnitude of the offset torque to be applied by the motors as a function of the envelope of the angular acceleration of the steering shaft, as modified by a scaling factor whereby a maximum defined offset torque is applied at a maximum defined amplitude and angular acceleration of the steering shaft.

8. A method as claimed in claim 7, further comprising setting a minimum offset torque to be applied by the motors.

9. A method as claimed in claim 7, further comprising setting a desired maximum rattle frequency of the steering shaft.

10. A method as claimed in claim 7, further comprising setting a desired maximum rattle angle of the steering shaft.

11. A method as claimed in claim 7, further comprising selecting a dynamic mode or a static mode.

12. A steer-by-wire steering system as claimed in claim 2, comprising a maximum rattle frequency arrangement for setting a desired maximum rattle frequency of the steering shaft.

13. A steer-by-wire steering system as claimed in claim 12, further comprising a maximum rattle angle arrangement for setting a desired maximum rattle angle of the steering shaft.

14. A steer-by-wire steering system as claimed in claim 13, further comprising a selector arrangement for selecting a dynamic mode or a static mode.

15. A steer-by-wire steering system as claimed in claim 14, wherein the driver-operated steering input member comprises a steering wheel.

16. A method as claimed in claim 8, further comprising setting a desired maximum rattle frequency of the steering shaft.

17. A method as claimed in claim 16, further comprising setting a desired maximum rattle angle of the steering shaft.

18. A method as claimed in claim 17, further comprising selecting a dynamic mode or a static mode.

* * * * *